W. V. ISGRIG.
AUTOMOBILE BUMPER.
APPLICATION FILED MAR. 12, 1919.
1,353,241. Patented Sept. 21, 1920.
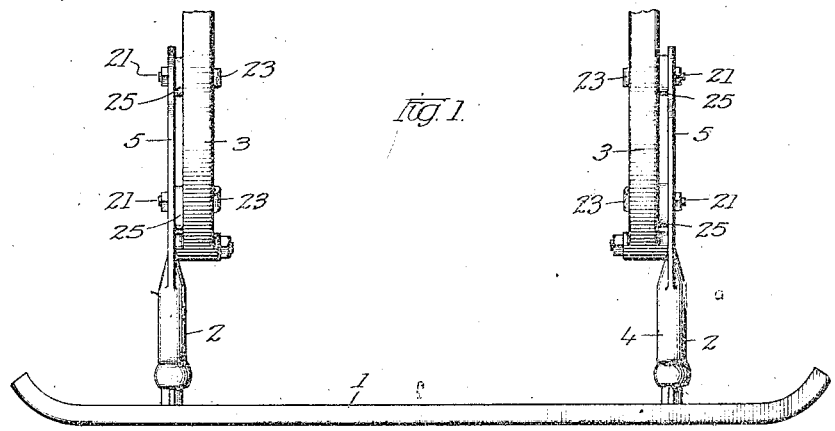
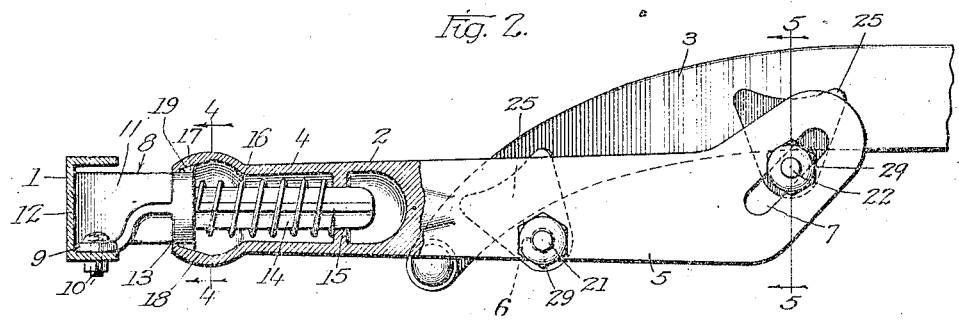
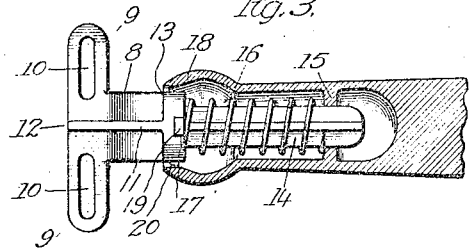 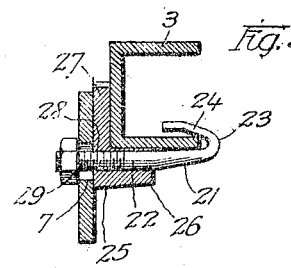
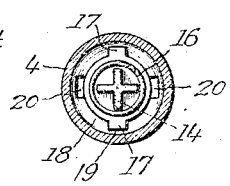 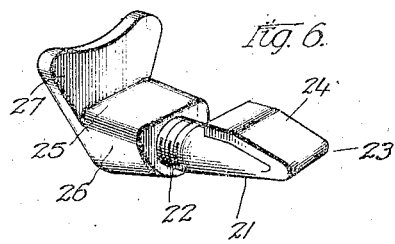
WITNESSES:
Robert F Weir
Arthur W. Carlson
INVENTOR
Walter V. Isgrig.
BY Edson B. H. Tower, Jr.
ATTORNEY

UNITED STATES PATENT OFFICE.

WALTER V. ISGRIG, OF MILWAUKEE, WISCONSIN, ASSIGNOR TO BADGER MANUFACTURING CORPORATION, OF MILWAUKEE, WISCONSIN, A CORPORATION OF DELAWARE.

AUTOMOBILE-BUMPER.

1,353,241.  Specification of Letters Patent.  Patented Sept. 21, 1920.

Application filed March 12, 1919. Serial No. 282,095.

*To all whom it may concern:*

Be it known that I, WALTER V. ISGRIG, a citizen of the United States, residing at Milwaukee, in the county of Milwaukee and State of Wisconsin, have invented new and useful Improvements in Automobile-Bumpers, of which the following is a specification.

This invention relates to automobile bumpers.

Automobile bumpers ordinarily comprise a bumper bar extending across the end of the vehicle and a pair of supporting brackets therefor secured to the frame of the vehicle. When a rigid bumper bar is used, the supporting brackets are usually made yieldable to cushion the shock of impact. A common form of yieldable bracket includes two telescopically arranged members yieldably maintained in extended relation. As heretofore made, this type of bracket is objectionable in that the wear upon the interengaging parts of the telescoping members results in loose play between the members and a consequent rattling when the vehicle is in motion.

One object of this invention is to provide a bumper bracket of the type mentioned which shall be free from the above objection.

Another object is to provide a yieldable bumper bracket having relatively slidable parts which are firmly held against relative lateral movement while in normal extended condition.

Another object is to provide an improved bumper bracket which may be clamped with equal facility to either of the forwardly extending frame members of an automobile.

Other objects and advantages will hereinafter appear.

One embodiment of the invention is illustrated in the accompanying drawings.

The views of the drawings are:

Figure 1 is a plan of a bumper attached to the forwardly extending frame members of an automobile.

Fig. 2 is an enlarged side elevation, partly in section, of the bumper illustrated in Fig. 1.

Fig. 3 is a horizontal section of a portion of the bumper bracket.

Fig. 4 is a vertical section on the line 4—4 of Fig. 2.

Fig. 5 is a vertical section on the line 5—5 of Fig. 2 illustrating the means for attaching the bumper bracket to an automobile frame member.

Fig. 6 is a perspective of a hook bolt and bearing member which form parts of the attaching means.

The bumper bar 1 is supported by a pair of brackets 2 removably secured to the forwardly extending frame members 3 of an automobile or other motor vehicle. Each bracket includes a supporting arm having at one end a longitudinal socket 4 for receiving a plunger 8. The other end of the arm extends rearwardly in flattened form to provide an attaching portion 5 for mounting at the side of the automobile frame member. Suitable openings, such as a perforation 6 and an inclined slot 7 are formed in the attaching portion 5 for receiving clamping bolts to be hereinafter described. The brackets are identical in shape, and hence interchangeable so that either may be secured to a frame member on either side of the vehicle.

Plunger 8 may be designed for connection with any form of bumper bar. In the present instance the plunger is adapted to be adjustably connected to a U-shaped channel bar, and for this purpose is provided with laterally extending ears 9 having adjusting slots 10. Bolts 10' passing through the slots connect the ears with the lower flange of the bar. The plunger is further provided with a vertical flange 11 whose vertical end 12 squarely abuts the vertical web of the bar.

The body of the plunger 8 is slidably supported within the open end 13 of the socket 4. The inner end of the plunger is reduced to form a stem 14. An annular flange 15 within the socket constitutes a support and guide for the stem. A compression spring 16, interposed between the body of the plunger and the flange 15, yieldably maintains the plunger in its extreme outer position.

The outward movement of the plunger is limited by a plurality of lugs 17 carried thereby and arranged to contact with the inner wall of the socket 4. Although only two diametrically arranged lugs are shown three or more may be employed. Each of the lugs is provided with an inclined end 19 for coöperation with a beveled surface 18 formed on the inner wall of the socket 4.

As the plunger is pressed outwardly by the spring 16, the inclined ends 19 of the lugs are forced into wedging engagement with the beveled surface 18. The plunger is thus firmly held against lateral movement relative to the socket 4, and rattling is positively prevented.

For purposes of assembly suitable slots 20 are provided in the wall of the socket 4 to permit the passage of the lugs therethrough. The parts are assembled in the following manner:—

After the spring 16 and stem 14 have been loosely positioned in the socket 4 with the lugs 17 opposite the slots 20, the plunger is forced inwardly against the pressure of the spring until the lugs have passed completely through the slots. The plunger is then rotated in its bearings in the sockets so as to move the lugs out of alinement with the slots. Ordinarily the lugs and slots are caused to assume the relative positions indicated in Fig. 4. In this position the parts cannot be taken apart until the plunger has been again rotated through approximately 90°. The connection of the bumper bar with the plunger normally prevents such rotation.

The forwardly extending frame members of an automobile ordinarily comprise channel bars having downwardly curved ends. Among the numerous types of motor vehicles there is considerable variation in the shape and size of the channel bars. The thickness of the flanges of the channel bars also varies. Obviously it is desirable to provide a clamping means by which the bumper may be secured to the frame members of the various types of vehicles. This may be accomplished by the use of hook bolts such as that shown in Figs. 5 and 6 of the drawings.

Each bolt 21 comprises a shank 22 having a broad flattened end bent upon itself to form a hook 23. The return bend 24 of the hook is sharply inclined with respect to the shank. By this construction the hook of the bolt is adapted to wedgingly grip the free edge of a channel bar flange, irrespective of the thickness thereof.

An L-shaped clamping member 25 is employed with each hook bolt. The horizontal leg 26 thereof has a flat upper face for engagement with the outer face of a flange of the channel bar, and is provided with an opening 28 therethrough for slidably receiving the shank 22 of the hook bolt. The vertical leg 27 of the clamping member is designed to firmly engage the vertical web of the channel bar. The bolt and bearing member together thus form a clamp for securely gripping the channel bar.

Two such clamps are employed with each bumper bracket. The bolt of one clamp passes through the perforation 6 of the attaching portion 5. The other clamp is adjustably connected with the portion 5 through the slot 7. When the nuts 29 on the free ends of the bolts are screwed home, the vertical leg 27 of each bearing member is pressed firmly against the vertical side of the channel bar and the edge of the flange of the bar is thrust with considerable force beneath the inclined return bend 24 of the hook bolt.

In the position of the bracket shown in Fig. 2 both of the clamps coöperate with the lower flange of the channel bar. If desirable, however, the bracket may be secured to the channel bar in such position that both clamps coöperate with the upper flange of the channel bar. In such position each bearing member 25 would ordinarily assume an inverted position with the leg 26 overlying the upper flange. A still further adjustment may be had by inverting the bracket arm. In such position the slot 7 would incline downwardly and to the rear, rather than upwardly and to the rear, and the forward clamp would ordinarily engage the upper flange while the rear clamp would engage the lower flange.

Thus it will be seen that a yieldable bracket has been provided which may be removably clamped to either of the forwardly extending frame members of a motor vehicle in either an upright or inverted position.

It will be further noted that a very effective clamping means has been provided, by which a bumper bracket may be firmly secured to a frame member of a motor vehicle irrespective of the shape or size of the frame member or the thickness of the flanges thereof.

One embodiment of the invention has been specifically described. It is to be understood, however, that the purpose of the foregoing description is to make clear the construction and operation of one form of the invention and should not, therefore, be construed in a limiting sense.

What I claim is:—

1. In a bumper the combination of a bumper bar, two plungers removably secured to said bar, a supporting member for each plunger having a bearing for supporting said plunger, and a flat sided arm extending axially of said plunger, and clamping members connected with said arms and reversibly arranged so that said clamping members are adapted to all engage either the upper or lower flanges of the frame members of an automobile, or to engage both the upper and lower flanges of the frame members when said arms are turned upside down.

2. A bumper bracket comprising an arm for mounting upon an automobile frame, and having a beveled surface, a member slidably supported by said arm and having a beveled surface for coöperation with the beveled surface on said arm, and yieldable means for maintaining the beveled surfaces of said arm and said member in wedging engagement.

3. A bumper bracket having a member provided with a hollow portion, a plunger mounted for longitudinal sliding movement in said hollow portion, a spring for yieldably maintaining the plunger in one position in said hollow portion, and means whereby the pressure of the spring causes a wedging engagement of the plunger with the hollow portion to prevent relative lateral movement therebetween.

4. A bumper bracket comprising a member for connection with the frame of an automobile and having a hollow portion provided with an inclined surface, a plunger for connection with a bumper bar and slidably mounted within said hollow portion, projections on said plunger for engaging said inclined surface to limit the outward movement of said plunger and to prevent lateral play between the plunger and hollow portion, and a spring for yieldably maintaining the plunger at the limit of its outward movement.

5. A bumper bracket comprising an arm for connection to an automobile frame and having a beveled surface thereon, a longitudinally movable member having a beveled surface coöperating with the beveled surface on said arm, and resilient means associated with said arm and member for maintaining the respective beveled surfaces in engagement whereby free lateral movement is eliminated to prevent rattling of the parts.

6. A bumper having in combination a bumper bar, a plunger secured thereto, a supporting member for the plunger, the supporting member and plunger having coöperating inclined surfaces, resilient means arranged between the plunger and supporting member whereby free lateral movement thereof tending to cause rattling is prevented, an arm extending rearwardly of the supporting member, and clamping means connected with the arm and interchangeably engaging the upper or lower flange of the frame member of an automobile.

7. A bumper bracket comprising a support having one end forming a socket, a plunger mounted for longitudinal sliding movement in the socket, and a spring for yieldingly maintaining the plunger and the socket in wedging engagement.

8. A bumper bracket for supporting a bumper bar for connection to a vehicle frame, comprising a plunger for connection to the bumper bar, a supporting member for the plunger, the supporting member and plunger having coöperating inclined surfaces, resilient means arranged between the plunger and supporting member and maintaining the same against free lateral movement tending to cause rattling, and an arm extending rearwardly of the supporting member for connection with the vehicle frame.

In witness whereof I have hereunto subscribed my name.

WALTER V. ISGRIG.